United States Patent
Fuse et al.

(10) Patent No.: US 6,431,710 B2
(45) Date of Patent: *Aug. 13, 2002

(54) OPTICAL APPARATUS

(75) Inventors: Kenji Fuse, Yokosuka; Mikio Shiraishi, Yokohama; Yasuo Otsuka, Chigasaki; Nobuyuki Kaku, Kanagawa; Hidehiro Ikeda, Fujisawa, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/911,806

(22) Filed: Jul. 25, 2001

Related U.S. Application Data

(63) Continuation of application No. 09/347,454, filed on Jul. 6, 1999, now Pat. No. 6,280,038.

(30) Foreign Application Priority Data

Jul. 3, 1998 (JP) .......................................... 10-189372

(51) Int. Cl.$^7$ ............................................. G03B 21/18
(52) U.S. Cl. ...................................................... 353/57
(58) Field of Search ............................................ 353/57

(56) References Cited

U.S. PATENT DOCUMENTS 6,007,205 A    12/1999  Fujimori
6,280,038 B1 *  8/2001  Fuse et al. ..................... 353/57

FOREIGN PATENT DOCUMENTS

JP              9-133911           5/1997

* cited by examiner

*Primary Examiner*—N. Le
*Assistant Examiner*—Etienne P LeRoux
(74) *Attorney, Agent, or Firm*—Antonelli, Terry, Stout & Kraus, LLP

(57) ABSTRACT

An optical equipment having a discharge lamp for supplying light, and first, second and third light valves for projecting the light from the equipment, having an air intake opening arranged on one side of the equipment, a ventilation device associated with the air intake opening so as to draw in air from outside of the equipment through the air intake opening and a ventilation path arranged between an outlet of the ventilation device and the first, second and third light valves. The ventilation path includes a plurality of partition members which divide the ventilation path into first, second and third air flow paths so as to cool the first, second and third light valves respectively by air from the ventilation device.

3 Claims, 5 Drawing Sheets

OPTICAL APPARATUS

CROSS REFERENCE TO RELATED APPLICATION

This is a continuation of U.S. application Ser. No. 09/347,454, filed Jul. 6, 1999, now U.S. Pat. No. 6,280,038, the subject matter of which is incorporated by reference herein.

BACKGROUND OF THE INVENTION

The present invention relates to optical equipment, such as a liquid crystal projector. Especially, the invention is concerned with optical equipment that has a suitable cooling system to cool a light valve arrangement in the optical equipment.

A conventional optical apparatus having a light valve arrangement, as described in Japanese patent Laid-open Publication 8-179424, employs an axial-flow type ventilation device located under the light valve arrangement as a ventilation system so as to prevent the light valve arrangement from reaching a high temperature. In this case, because the flow of air from the ventilation system can be applied to the light valve arrangement directly, the light valve arrangement can be cooled.

Because a ventilation system is provided below the light valve arrangement in the conventional optical equipment, the air is supplied from the base side of the equipment to the ventilation system. Thus, it was necessary to provide a space on the base side of the equipment to reduce the flow resistance of the air that is drawn in from the equipment side. Further, because the height of the optical equipment becomes equal to the height of the ventilation system and a rectifier added to the height of the projection lens or the light valve arrangement, it was difficult to make the equipment thin.

Further, such space was hard to provide in practical use underneath the projection lens (dead space) for this ventilation system, so that it was arranged at a position where it projected from underneath the projection lens, with a result that it wasn't possible to reduce the size of the whole device or effect a reduction of the height measurement.

SUMMARY OF THE INVENTION

Accordingly, it is an object of the present invention to provide optical equipment having a discharge lamp for supplying light, and a light valve device for projecting said light, comprising:

a case for housing said optical equipment;

an air intake opening arranged on the side of said case;

a ventilation device adapted to draw in air through said air intake opening; and a ventilation path arranged between said ventilation device and said light valve device, wherein said ventilation path is divided into a plurality of air flow paths so as to cool said light valve device by ventilated air from said ventilation device.

DETAILED DESCRIPTION OF THE PREFERRED EMBODIMENTS

A first embodiment of the present invention will be explained with reference to FIG. 1.

Figure 1:
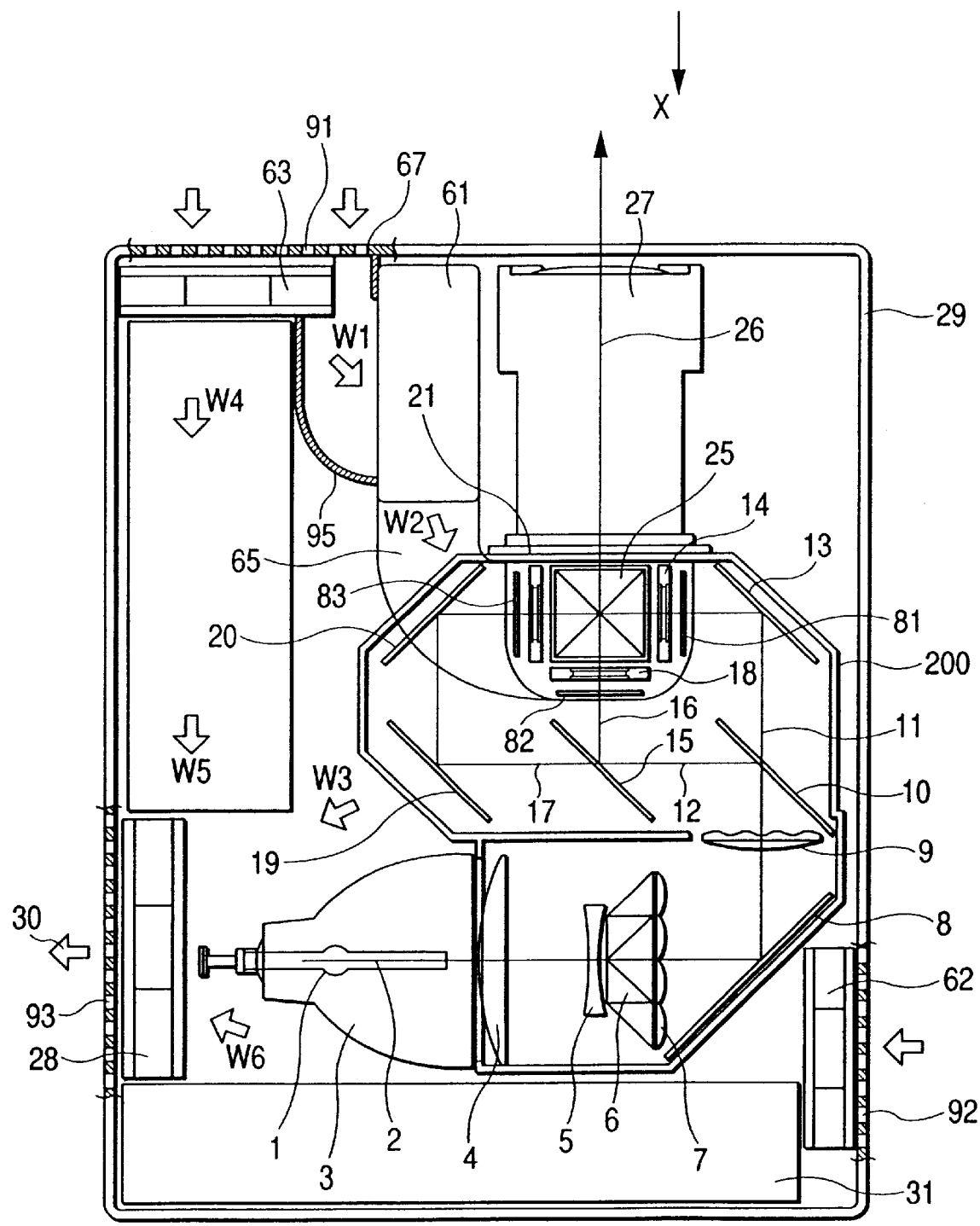
FIG. 1 shows a diagrammatic plan view of one of the embodiments of the optical equipment according to the present invention.

In FIG. 1, a light beam 2 from a discharge lamp 1, that is used as a light source, is directed to a polarizing conversion element 6 by means of a lamp reflector 3 in the form of a parabolic face mirror reflector, through a lens 4 and a lens 5. The light beam 2 is illuminated on a first dichroic mirror 10 through first lens array 7, mirror 8, and second lens array 9.

A red color light component 11 is passed by mirror 10, and light beam 12, including a green color light component and a blue color light component, is reflected by the first dichroic mirror 10. The red color light component 11 is reflected by a first mirror 13 onto a first light valve 14 through a first polarization plate 81. The green color light component included in the light beam 12 is reflected by a second dichroic mirror 15 onto a second light valve 18 through a second polarization plate 82. The remaining blue color light component 17 included in the light beam 12 passes through the second dichroic mirror 15 and is illuminated on a third light valve 21 through a second mirror 19, a third mirror 20 and a third polarization plate 83.

A portion of the red light component passing through the first light valve 14, a portion of the green light component passing through the second light valve 18, and a portion of the blue light component passing through the third light valve 21 are combined by a cross dichroic prism 25. The combined outgoing light 26 from the cross dichroic prism 25 is projected on a screen (not shown) by a projection lens 27.

In this embodiment, a color separation optical system is formed by the first dichroic mirror 10, the second dichroic mirror 15, the first mirror 13, the second mirror 19, and the third mirror 20, and the color separation optical system is arranged around the cross dichroic prism 25. Further, the illumination optical system is designed to improve the utilization efficiency of the illumination light from the light source and to obtain uniform illumination light. The illumination optical system is formed by the discharge lamp 1 operating as a light source, the lamp reflector 3, the lens 4, the lens 5, the polarizing conversion element 6, the first lens array 7 that forms a optical integrator, the mirror 8, and the second lens array 9. In addition, there is a lamp power supply 31 that provides power for the light source. In this embodiment, the projection lens 27, the cross dichroic prism 25, the color separation optical system, the illumination optical system and the lamp power supply 31 are arranged from an upper part to a lower part in FIG. 1 in this order.

Further, optical parts of the color separation optical system and the illumination optical system are held within an optical case 200. In addition, the optical equipment includes a case 29, which is provided with a first air intake opening 91, a second air intake opening 92, and an air exhaust opening 93. A ventilation unit 61 is provided for cooling the first light valve 14, the second light valve 18, and the third light valve 21, respectively. A centrifugal fan is utilized as the ventilation unit 61 in this embodiment. Numeral 65 denotes a ventilation path to lead a cool air flow toward the lower portion of the optical case 200, and numeral 67 denotes a ventilation path for intake air flow. Numeral 95 denotes a duct to lead intake air to the ventilation unit 61.

In FIG. 1, the air flow taken in from the air intake opening 91, flows as shown by arrows W1 to W5 in the case 29 from operation of a fan for intake of air 63. Air is drawn into the ventilation path 67 from the intake side of the ventilation unit 61. The air flow that is used for cooling the first light valve 14, the second light valve 18, and the third light 21 passes along the ventilation path 65 from the exhaust side of the ventilation unit 61, comes out into the upper part of the case 29 and is discharged in the case 29.

Further, in this embodiment, as above-mentioned, the case 29 is provided with a second air intake opening 92. The intake air is drawn in by the fan 62 and flow through the first lens array 7, the polarizing conversion element 6, lens 5, and the lamp power supply 31 and cools them.

In addition, the heat that is generated from the light source that reaches a high temperature does not exert an influence on the structural parts other than the light source itself. An exhaust fan 28 used for cooling the light source is arranged beside the discharge lamp 1 and the lamp reflector 3 so as not to influence structural parts other than the light source by the high temperature that is generated by the light source, and a high velocity air flow 30 is exhausted to the outside of the case 29 of the projector through the exhaust opening 93. The lamp power supply 31 is arranged beside the discharge lamp 1. Simultaneously, the exhaust fan 28 draws out air from the case 29 for cooling the first light valve 14, the second light valve 18 and the third light valve 21.

Figure 2:
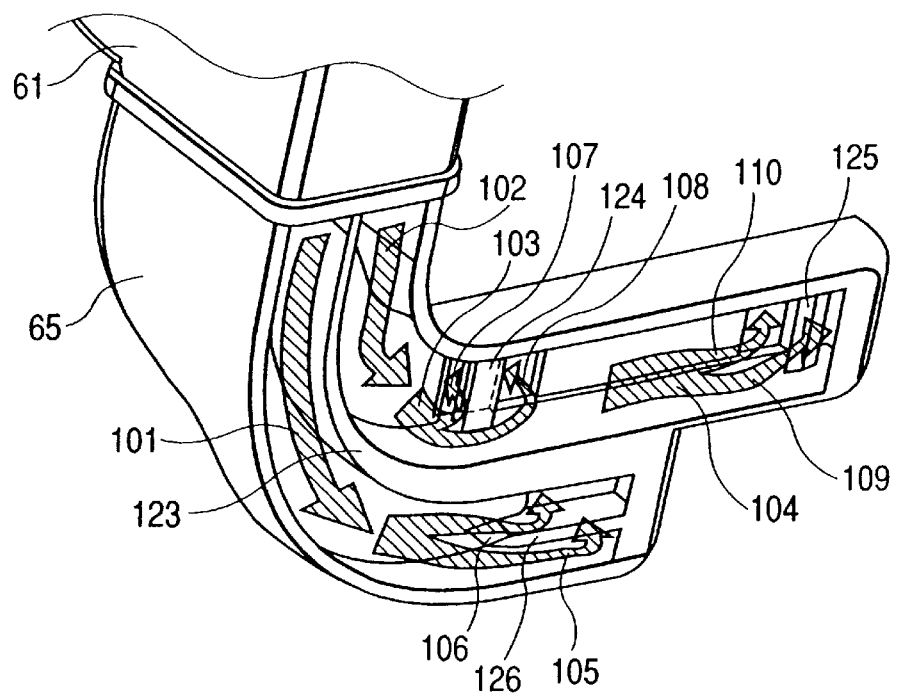
FIG. 2 is a perspective view that shows an example of a ventilation path.
Figure 3:
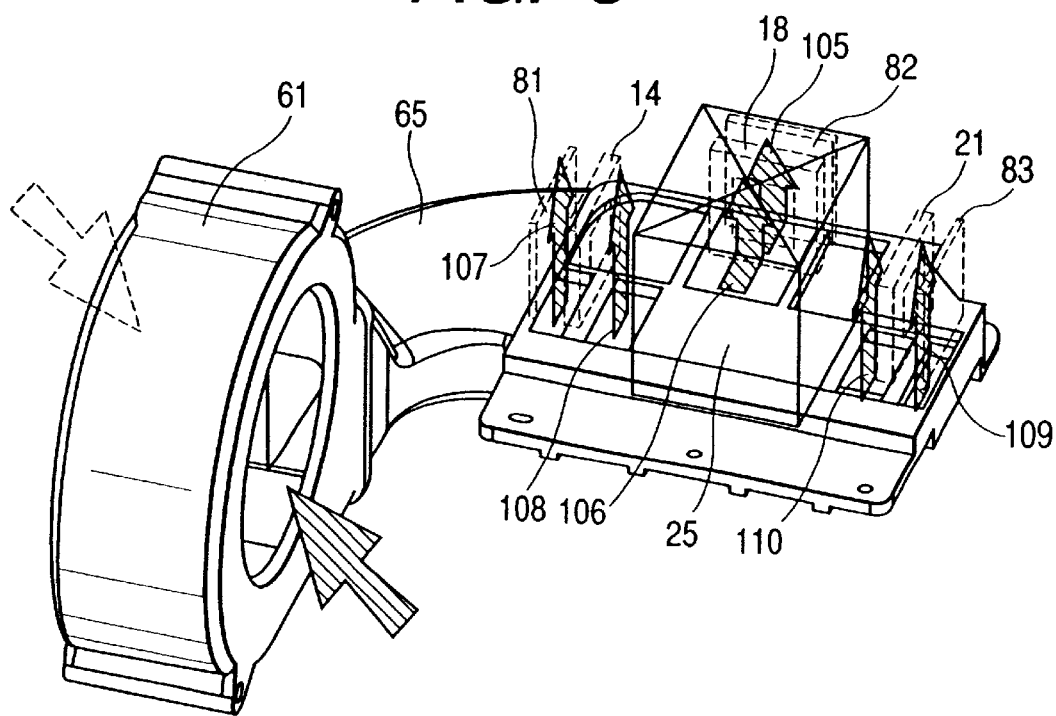
FIG. 3 is a perspective view that shows an example of cooling structure using the ventilation path that is illustrated in FIG. 2.

In the following, details of the cooling provided in accordance with present invention will be explained with reference to FIG. 2 and FIG. 3. In FIG. 2 and FIG. 3 the ventilation unit 61 is arranged at the opposite side of the position shown in FIG. 1. Accordingly, a cooling structure is shown in which the ventilation unit 61 is on the right side of the projection lens 27 as you face it. However, it is possible for the ventilation unit 61 to be arranged on the left side of projection lens 27 as you face it.

FIG. 2 is a perspective view that shows an example of the ventilation path. FIG. 3 is a perspective view that shows an example of the cooling structure using the ventilation path that is indicated in FIG. 2. The perspective views of FIG. 2 and FIG. 3 represents a view as seen from the X direction of FIG. 1.

As shown in FIG. 2, a first guide member 123, a second guide member 124, a third guide member 125, and a fourth guide member 126 are arranged such that a cooling air flow is divided into a first air flow path 101 and a second air flow path 102 by the first guide member 123. Consequently, the cooling air is divided into a first air flow, which passes through the first air flow path 101 to cool the second light valve 18, and a second air flow which passes through the second air flow path 102 to cool the first light valve 14. Next, the second air flow path 102 is divided into a third air flow path 103 and a fourth air flow path 104 by the second guide member 124. Consequently, the cooling air is divided into a third air flow and a fourth air flow. The third air flow passes through the third air flow path 103 to cool the first light valve 14. The fourth air flow passes through the fourth air flow path 104 to cool the third light valve 21.

Further, the first air flow path 101 is divided into a fifth air flow path 105 and a sixth air flow path 106 by the fourth guide member 126. Consequently, the cooling air is divided into a fifth air flow and a sixth air flow. The fifth air flow passes through the fifth air flow path 105 and flows to the incoming light side of the second light valve 18 to cool the incoming light side of the second light valve 18. The sixth air flow passes through the fifth air flow path 106 and flows to the outgoing light side of the second light valve 18 to cool the outgoing light side of the second light valve 18.

Further, the second air flow path 102 is divided into a seventh air flow path 107 and an eighth air flow path 108 by the second guide member 124. Consequently, the cooling air is divided into a seventh air flow and an eighth air flow. The seventh air flow passes through the seventh air flow path 107 and flows to the incoming light side of the first light valve 14 to cool the incoming light side of the first light valve 14. The eighth air flow passes through the eighth air flow path 108 and flows to the outgoing light side of the first light valve 14 to cool the outgoing light side of the first light valve 14.

Further, the fourth air flow path 104 is divided into a ninth air flow path 109 and a tenth air flow path 110 by the third guide member 125. Consequently, the cooling air is divided into a ninth air flow and a tenth air flow. The ninth air flow passes through the ninth air flow path 109 and flows to the incoming light side of the third light valve 21 to cool the incoming light side of the third light valve 21. The tenth air flow passes through the tenth air flow path 110 and flows to the outgoing light side of the third light valve 21 to cool the outgoing light side of the third light valve 21.

Next, the cooling structure for cooling the light valves will be explained in detail with reference to FIG. 3. As shown in FIG. 3, the fifth air flow, that is one of the air flows for cooling with air flowing from the ventilation path 65, is ventilated to the incoming light side of the second light valve 18. Accordingly, the fifth air flow is ventilated to the side of the second incoming light side polarizing plate 82 and is used for cooling both the incoming light side of the second light valve 18 and the second incoming light side polarizing plate 82.

Further, the seventh air flow, that is ventilated from the ventilation path 65, flows to the incoming light side of the first light valve 14. Accordingly, the seventh air flow is ventilated to the side of the first incoming light side polarizing plate 81 and is used for cooling both the incoming light side of the first light valve 14 and the first incoming light side polarizing plate 81. The eighth air flow is ventilated to the outgoing light side of the first light valve 14 and cools both the outgoing light side of the first light valve 14 and the incoming light side of the cross-dichroic prism 25.

Further, the ninth air flow, that is ventilated from the ventilation path 65, flows to the incoming light side of the third light valve 21. Accordingly, the ninth air flow is ventilated to the side of the third incoming light side polarizing plate 83 and is used for cooling both the incoming light side of the third light valve 21 and the third incoming light side polarizing plate 83. The tenth air flow ventilated from the ventilation path 65 flows to the outgoing light side of the third valve 21 and the incoming light side of the cross dichroic prism 25.

One example of the structure that is used for cooling the first light valve 14, the second light valve 18 and the third light valve 21 has been described. However, the air volume and air velocity can be easily adjusted for each of the first to tenth air flows, if the position and the shape of each of the first to fourth guide members 123, 124, 125, and 126 is arranged properly. For instance, in the case where the calorific value of the outgoing light side of the second light valve 18 and the outgoing light side of the first light valve 14 is large, each guide member, such as guide members 123, 124, 125, may be arranged so as to carry a maximum amount of the ventilation volume and air velocity of the sixth air flow for cooling the second light valve 18 and the eighth air flow for cooling the first light valve 14.

Further, in the case where the calorific value of the third light valve is not large, the ventilation of the ninth air flow and the tenth air flow is throttled by the guide members. Therefore, the value of the increasing temperature can be substantially equalized. Further, it is easy to control the value of the increasing temperature on the incoming light side of each the first to third incoming light side polarizing plates 81, 82, and 83, if the velocity of each of the fifth, seventh and ninth air flows is adjusted by the second to fourth guide members 124, 125, and 126. As a result, the air velocity produced by ventilation unit 61 can be used very efficiently.

As shown in FIG. 2 and FIG. 3, in accordance with this invention, since the ventilation path is formed by a plurality of divided flow paths, each of the first to the third light valves 14, 18, and 21 has their own flow path such as flow paths 101, 102, 103, and 104. Therefore, the present invention is effective for achieving miniaturization and a thin type of optical equipment. Further, the present invention can provide optical equipment that has a cooling system which operates with a high efficiency to cool a light valve arrangement having a large calorific value.

In addition, the present invention, which uses a centrifugal fan as the ventilation unit 61, provides divided flow paths to obtain a smooth flow of the cooling air so as to reduce the pressure loss of the air flow to the incoming and outgoing light side of each light valve. Accordingly, a sufficient volume of air can be achieved. Further, the present invention can provide an efficient cooling system and cut down on the height of the optical equipment. The present invention can supply cooling air from the ventilation unit 61 to each the first to third light valves 14, 18, and 21 so as to equalize the increase in temperature of each of the first to third light valves 14, 18, and 21. Therefore, the present invention can adequately decrease the temperature of each of the first to the third light valves 14, 18, and 21.

The present invention provides optical equipment having an efficient cooling system that can control the air volume and air flow velocity freely. The present invention can adjust the air volume and air flow velocity to the second light valve 18 and the third light valve 21 so that their light absorption factors become large, and control the air volume and air flow velocity to the first light valve 14 so that its light absorption factor becomes small. Therefore, the present invention can adjust the air flow that passes through the flow path and provide optical equipment with an efficient cooling system. Further, the present invention can control the incoming and outgoing right side of the first to third valves 14, 18, and 21 so as to reduce the temperature of each the first to the third light valves 14, 18, and 21 to within a permissive range.

In the above-described embodiment, the air flow from the ventilation unit 61 is divided by the first to fourth guide members 123, 124, 125, and 126. A similar effect can be obtained if the structure is divided by different pipes having a plurality of cross sections. In this embodiment, because the first air intake opening 91 is arranged on the end of the case 29 and the exhaust opening 93 is arranged on the side of the case 29, the height of the optical equipment is reduced. Further, because an exhaust fan 28 is arranged beside the discharge lamp 1, the exhaust fan 28 cools the discharge lamp 1 easily.

Figure 4:
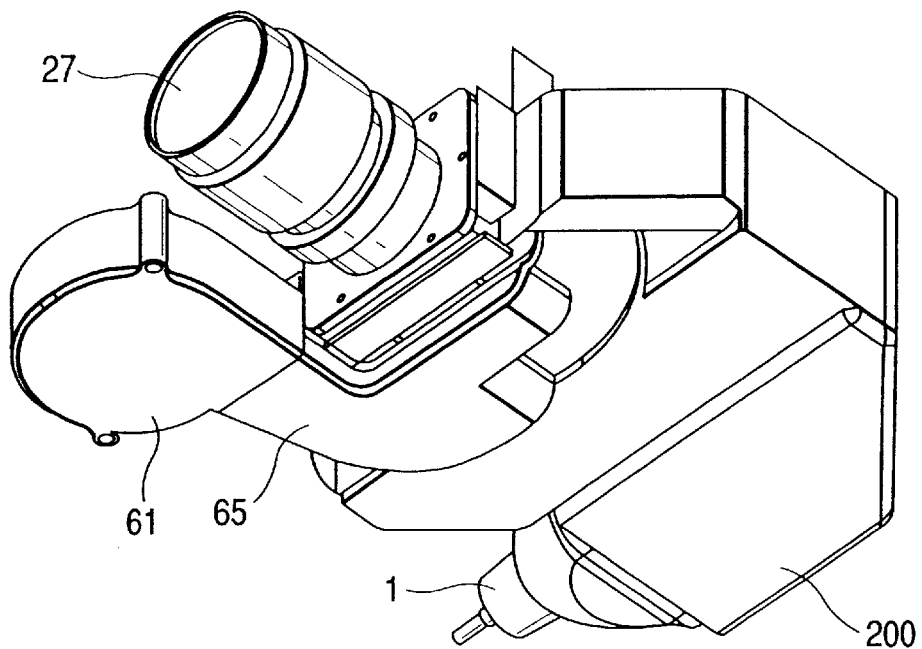
FIG. 4 is a perspective view that shows an embodiment of the optical equipment according to the present invention.
Figure 5:
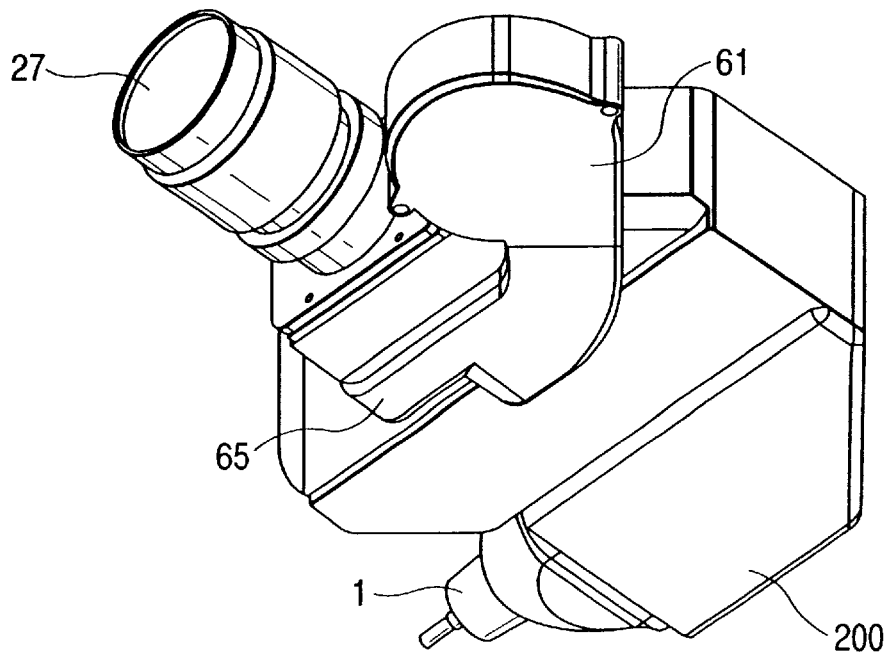
FIG. 5 is a perspective view that shows another embodiment of the optical equipment according to the present invention.

Next, the position of the ventilation unit in the optical equipment according to the present invention, are shown in FIG. 4 and FIG. 5, will be described. FIG. 4 is a perspective view that shows an embodiment of the optical equipment according to the present invention. FIG. 5 is a perspective view that shows still another embodiment of the optical equipment according to the present invention. In FIG. 4 and FIG. 5, each element that has the same function as described with reference to FIG. 1 to FIG. 3 is identified by the same number. FIG. 4 and FIG. 5 are perspective views as seen from the bottom of the equipment.

In the above-mentioned embodiment shown in FIG. 1, the ventilation unit 61 is stationed on the left side of the projection lens 27. The ventilation unit 61 is positioned in this embodiment at an angle of 90 degrees relative to the ventilation unit 61 in FIG. 1. The ventilation unit 61 in FIG. 4 is positioned on the opposite side as compared to the ventilation unit 61 in FIG. 5.

The ventilation unit 61 shown in FIG. 4 and FIG. 5 can produce substantially the same effect as that of the above-mentioned embodiment. Accordingly, the air intake direction of the ventilation unit 61 is arranged at the side of the case 29, especially the upper side of the case 29 shown in FIG. 1, and so the intake of the air can be accomplished with little air flow resistance so as not to require space for an air flow path on the bottom side of the optical equipment. The same effect is provided furthermore whether the ventilation means is on the right or left of the projection lens 27, as shown in FIG. 4 and FIG. 5. When ventilation path 65 is located on the right or the left, such as for the optics unit 200 shown in FIG. 4 or FIG. 5, it is possible to provide a constitution that ventilates the first to the third light valves 14, 18, 21.

Figure 6:
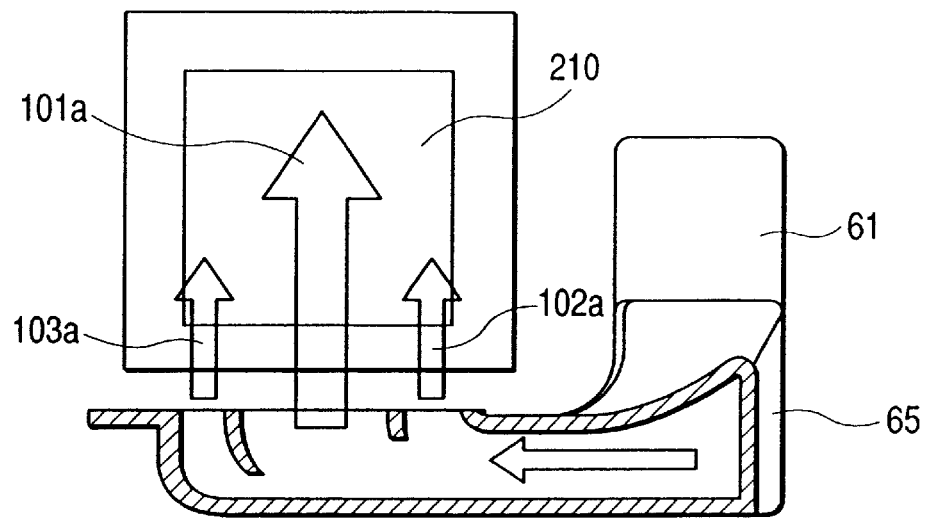
FIG. 6 is a sectional view that shows another example of the cooling structure that is used for optical equipment according to the present invention.

FIG. 6 is the sectional view that shows another example of the cooling arrangement that is used for optical equipment according to the present invention.

The cooling system according to the present invention can be applied in addition to the three light valves 14, 18, 21 individually. That is, it is possible also to adapt it to cool a light valve by applying a large amount of air to the center part of large calorific value of a large-sized sheet 210 of a light valve as shown in FIG. 6 to decrease the circumference.

In FIG. 6, the air flow through the ventilation path 65 from the ventilation in unit 61 is divided and flows to the center of the light valve 210 as a first air flow (arrow 101A), and to the peripheral part of the light valve 210 as a second air flow (arrow 102A) and a third air flow (arrow 103A) so as to cool the large light valve 210. In this case, because the intake of the air by the ventilation unit 61 is produced from the side of the case 29, the optical equipment can reduce the intake air flow resistance, which is advantageous in thin type optical equipment.

Figure 7:
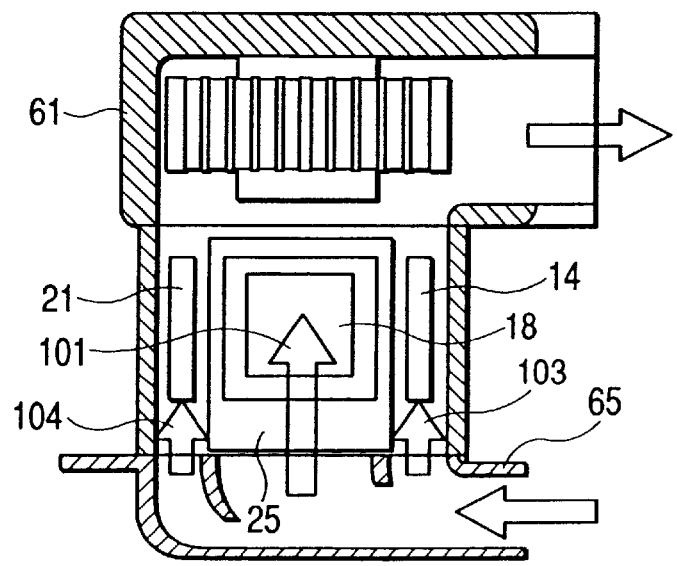
FIG. 7 is a sectional view that shows another embodiment of the cooling structure that is used for optical equipment according to the present invention.

In the foregoing embodiment, the ventilation unit 61 is utilized as a means to direct an air flow toward the light valve, however, the following embodiment provides a ventilation unit 61 which draws in air to cause an air flow through the light valve. FIG. 7 is the sectional view that shows another embodiment of the cooling structure that is used for optical equipment according to the present invention.

In FIG. 7, the ventilation unit 61 is positioned with the light valves on the exhaust side thereof, and the ventilation unit 61 causes air for cooling to be drawn in through the first to third light valves 14, 18, 21. After the air, which flows through the ventilation path 65 and the second air flow path 103, cools the first light valve 14, the air is exhausted through the ventilation unit 61. After the air, which flows through the first air flow path 101, cools the second light valve 18, the air is exhausted through the ventilation unit 61. Also, after the air, which flows through the fourth air flow path 104, cools the third light valve 21, the air is exhausted by the ventilation unit 61 to the outside of the case 29.

In the foregoing embodiment, the structure is such that the depth of the light projector is larger than the width of the light projector. However, the present invention is not limited to that. In other words, the width of the light projector may be larger than the depth of the projector.

Figure 8:
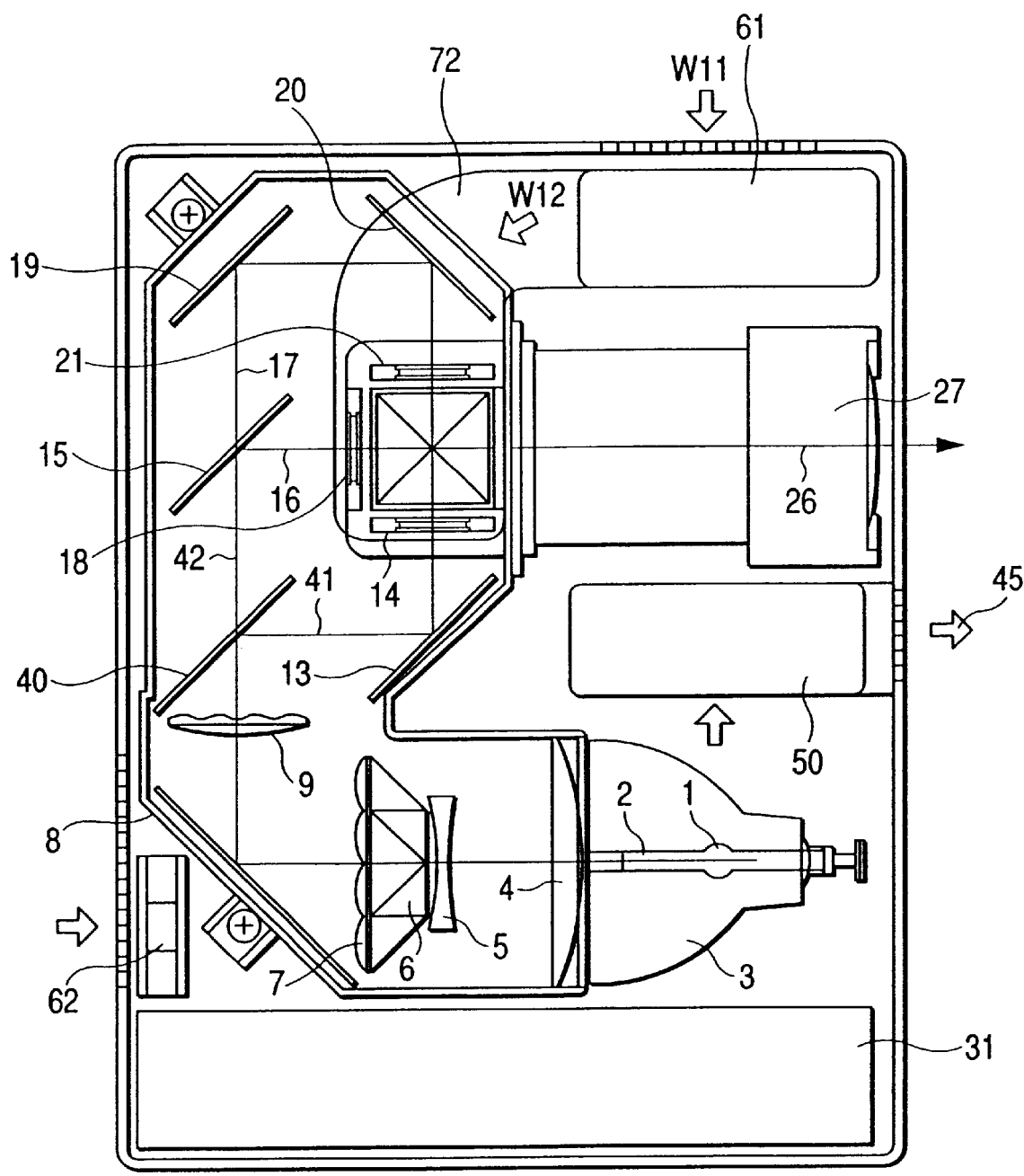
FIG. 8 is a diagrammatic plan view of still another embodiment of the optical equipment according to the present invention.

FIG. 8 is a plan view that shows a still further embodiment of the optical equipment according to the present invention. In FIG. 8, the light 2, from the discharge lamp 1 that is used as a light source is directed to a polarizing conversion element 6 by a lamp reflector 3 in the form of a parabolic mirror reflector, via a lens 4 and lens 5, and then is directed to a dichroic mirror 40 through a first lens array 7, a mirror 8, and a second lens array 9. The dichroic mirror 40 reflects a red color light component 41 and passes the remaining light beam 42, including a green color light component and a blue color light component. The red color light component 41 is reflected by the mirror 13 and directed to a first light valve 14. The green color light component 16 included in the light beam 42 is reflected by the second dichroic mirror 15 and is directed to the second light valve 18. The blue color light component 17 included in the light beam 42 is passed by the second dichroic mirror 15, and the blue color light component 17 is directed to the third light valve 21 through the second mirror 19 and the third mirror 20.

A portion of the red light component supplied from the first light valve 14, a portion of the green light component supplied from the second light valve 18, and a portion of the blue light component supplied from the third light valve 21 are combined by a cross dichroic prism 25. The combined outgoing light beam 26 from the cross-dichroic prism 25 is projected on a screen (not shown) by a projection lens 27. In this embodiment, the outgoing light from the discharge lamp 1 is bent to a U-shape and projected on the screen (not shown).

The heat that is generated from the light source and produces a high temperature is prevented from exerting an influence on the structural parts other than the light source. For this purpose, an exhaust fan 50 used for cooling the light source is arranged beside the discharge lamp 1 and the lamp reflector 3 so as to prevent the structural parts other than the light source from being influenced by the high temperature that is produced by the light source, and a high velocity air flow 45 is exhausted to the outside of the case 44 of light projector. The lamp power supply 31 is arranged beside the discharge lamp 1.

In FIG. 8, the projection lens 27 and the cross-dichroic prism 25 are aligned from right to left. The color separation optical system comprises the first dichroic mirror 40, the second dichroic mirror 15, the first mirror 13, the second mirror 19, and the third mirror 20, the color separation optical system being arranged around the cross dichroic prism 25.

Further, the illumination optical system is designed to improve the utilization efficiency of the illumination light from the light source and to obtain uniform illumination light. The illumination optical system is formed by the discharge lamp 1 operating as a light source, the lamp reflector 3, the lens 4, the lens 5, the polarizing conversion element 6, the first lens array 7 that forms an optical integrator, the mirror 8, and the second lens array 9. In addition, there is a lamp power supply 31 that provides power for the light source. In FIG. 8, the projection lens 27, the cross dichroic prism 25, the color separation optical system, the illumination optical system and the lamp power 31 are arranged from the upper part to the lower part in this order.

In the embodiment shown by FIG. 8, the ventilation unit 61 is arranged on the left side of the projection lens 27 similar to the embodiment of FIG. 1, but it also may be arranged on the right side thereof. The intake of the air by ventilation unit 61 is drawn in as shown by arrow W11, and is ventilated in the case as shown an arrow W12. Therefore, this optical equipment can be miniaturized, and the height of the equipment can be reduced. In FIG. 8, the exhaust fan 50 can be removed or moved to another place. The ventilation unit 61 may be stationed between the projection lens 27 and discharge lamp 1.

As explained above, in the optical equipment according to the present invention, the intake of cooling air is from a side face, and the intake air opening and the exhaust an opening are arranged on different side faces. Therefore, the air flow resistance of the optical equipment can be reduced and the cooling effect raised, while reducing height of the equipment. Further, because the ventilation path comprises a plurality of divided air flow paths in accordance with this invention, each of the first to third light valves 14, 18, 21 have individual air flow paths 101, 102, 103, 104, respectively. Therefore, this invention is useful for miniaturization of the equipment and provision of thin-type equipment, and can provide optical equipment with a highly efficient cooling system.

Further, the present invention uses a centrifugal fan as the unit means 61 and provides divided flow paths to obtain a smooth flow of cooling air so as to reduce the air pressure loss at the incoming and outgoing light sides of each of the light valves. Accordingly, a sufficient air flow volume can be obtained. Further the present invention can provide an efficient cooling system and cut down on the height of the optical equipment. Accordingly, the present invention can reduce the height of the optical equipment and provide for miniaturization of the optical equipment, while at the same time providing the optical equipment with a high efficiency cooling system. Further, the optical equipment can cool a plurality of light valves to a substantially equal temperature.

What is claimed is:

1. An optical equipment having a discharge lamp for supplying light, and a light valve device for projecting said light from said equipment comprising:
   an air intake opening arranged on one side of said equipment;
   a ventilation device associated with said air intake opening so as to draw in air from outside of said equipment through said air intake opening; and
   a ventilation path arranged between an outlet of said ventilation device and said light valve device,
   wherein said ventilation path includes a plurality of partition members which divide said ventilation path into first and second air flow paths so as to cool an incoming light side of said light valve device and an outgoing light side of said light valve device respectively by air from said ventilation device.

2. An optical equipment according to claim 1, further comprising:
   an exhaust opening arranged on a side of said equipment different from said one side on which said air intake opening is arranged; and
   an exhaust device enabling exhaust of said ventilated air through said exhaust opening.

3. An optical equipment according to claim 1, wherein said ventilation device is a centrifugal fan.

* * * * *